United States Patent [19]

Krapcho

[11] 3,725,403
[45] Apr. 3, 1973

[54] BENZOTHIAZINE DERIVATIVES
[75] Inventor: John Krapcho, Somerset, N.J.
[73] Assignee: E. R. Squibb & Sons, Inc., New York, N.Y.
[22] Filed: Oct. 20, 1970
[21] Appl. No.: 82,509

[52] U.S. Cl. ............260/243 R, 260/244 R, 424/246, 260/325, 260/293.57, 260/268 BC, 260/243 B, 260/247.2 A, 424/248, 424/274
[51] Int. Cl. ..............................................C07d 93/12
[58] Field of Search ..........................260/243, 243 R

[56] References Cited

UNITED STATES PATENTS 3,166,554  1/1965  Krapcho..............................260/243
3,341,519  9/1967  Krapcho..........................260/243 X

*Primary Examiner*—John M. Ford
*Attorney*—Lawrence S. Levinson, Merle J. Smith and Donald J. Perrella

[57] ABSTRACT

Disclosed herein are benzothiazines, benzoxazines, indolinones and derivatives thereof. The compounds of the invention possess central nervous system depressant activity as well as anti-bacterial and disinfectant activity.

7 Claims, No Drawings

BENZOTHIAZINE DERIVATIVES

THE INVENTION

This invention relates to compounds having the formula:

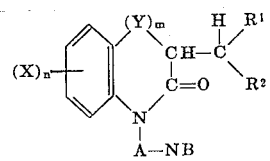

wherein X is hydrogen, halogen, trifluoromethyl, alkoxy, alkyl-thio, amino, dialkylamino, hydroxy, or nitro; Y is O, S, sulfone ($SO_2$) or sulfoxide (SO); $R^1$ is X-substituted-phenyl, thienyl, furyl, pyridyl or naphthyl; $R^2$ is X-substituted-phenyl, thienyl, furyl, pyridyl, naphthyl or cycloalkyl; m is 0 or 1 and n is 1 to 4; A is lower alkylene (e.g., from one to six carbons) and NB is a basic nitrogen containing radical; pharmaceutically acceptable salts thereof; and to processes for their preparation.

Among the suitable radicals represented by the symbol NB are: amino; (lower alkyl)amino; di(lower alkyl)amino; (hydroxy lower alkyl)amino; (hydroxy lower alkyl) (lower alkyl)-amino (e.g., N-2-hydroxyethyl-N-methylamino); phenyl(lower alkyl)-amino; N-phenyl lower alkyl(lower alkyl)amino; and saturated 5 to 7-membered monocyclic heterocyclic radicals of less than twelve carbon atoms, as exemplified by piperidino; (lower alkyl)piperidino; di(lower alkyl)piperidino; (lower alkoxy)-piperidino; homopiperidino; 2,3- or 4-piperidyl; 2,3- or 4-(N-lower alkylpiperidyl); pyrrolidino; (lower alkyl)pyrrolidino; di(lower alkyl)pyrrolidino; (lower alkoxy)pyrrolidino; 2- or 3-pyrrolidyl; 2- or 3-(N-lower alkyl pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; 4-X-substituted piperazino (e.g., $N^4$-ethylpiperazino; $N^4$-phenylpiperazino, and so forth); [hydroxy (lower alkyl)]-piperazino [e.g., $N^4$-(2-hydroxyethyl)piperazino]; (lower alkyl)-piperazino (e.g., $N^4$-methylpiperazino); di(lower alkyl)piperazino; (lower alkoxy)piperazino; homopiperazino; and 4-X-substituted homopiperazino (e.g., $N^4$-benzylhomopiperazino).

The terms "lower alkyl," "lower alkoxy," and "lower alkylene," as employed herein, include both straight and branched chain radicals of less than eight carbon atoms, for example, methyl, ethyl, propyl, isopropyl, butyl, isobutyl, t-butyl, amyl, methoxy, ethoxy, propoxy, isopropoxy, ethylene propylene, and the like.

The particularly preferred compounds are those wherein X is hydrogen, Y is sulfur or oxygen, $R^1$ and $R^2$ are phenyl or X-substituted phenyl, A is ethylene and NB is dilower alkyl amino.

The bases of Formula I form acid addition slats by reaction with the common inorganic and organic acids. Such inorganic salts as hydrohalides, e.g., hydrobromide, hydrochloride, hydroiodide, sulfates, nitrates, phosphates, borates, and so forth and organic salts as acetate, oxalate, tartrate, maleate, citrate, succinate, benzoate, ascorbate, salicylate, theophyllinate, camphorsulfonate, alkanesulphonate, e.g., methanesulfonate, arylsulfonate, e.g., benzenesulfonate, toluenesulfonate; cyclohexanesulfamic acid, p-toluenesulfonic acid, sulfamic acid, 2-naphthalenesulfonic acid, p-aminobenzoic acid, p-acetamidobenzoic acid, and the like, are also within the scope of the invention. It is frequently convenient to effect the purification of the product by forming the acid salt. The base may be obtained therefrom by neutralization with an alkali metal hydroxide such as sodium hydroxide, potassium hydroxide, and so forth.

The bases of Formula I also form quaternary ammonium slats, e.g., lower alkyl halides such as methyl chloride, methyl bromide, ethyl chloride, and so forth, lower alkyl sulfates such as methyl sulfate, ethylate sulfate, and so forth, monocyclic aryl (lower alkyl) halides and sulfates such as benzyl chloride, benzyl sulfate, and so forth. This is accomplished by reacting the base with the alkyl halide, sulfate, or the like.

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I or a physiologically acceptable salt thereof in a dosage range and in a manner similar to that used with chlordiazepoxide. In addition, the new compounds of the invention and the intermediates therefore in aqueous solution or suspension possess antibacterial acitvity and can be used as disinfectants against various staphylococci (e.g., *Staphylococci aureus*). For this purpose they are dissolved or suspended in water, preferably also containing a detergent, at a concentration of about 0.5 percent to about 5 percent and may be used as washes to disinfect walls and floors.

The compounds of the invention can be prepared by treating a compound of Formula II:

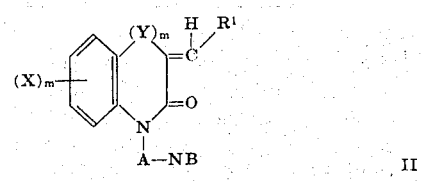

wherein X, Y, A, NB, $R^1$, $R^2$, m and n are as defined herein with a Grignard reagent having the formula $R^2MgBr$. The intermediate complex formed is then hydrolyzed by known means such as treating with aqueous ammonia halide, e.g., ammonium chloride or dilute inorganic acid, e.g., sulfuric or hydrochloric acid.

Equimolar ratios of reagents may be utilized, i.e., 1:1 molar ratio of the compound of Formula I and the Grignard reagent. However, an excess of Grignard reagent may be utilized to improve the yields.

The reaction is carried out in an organic solvent such as tetrahydrofuran, ether (usually mixtures of these solvents) and at temperatures of from 40° and 80° with the preferred temperature range being at reflux conditions.

The starting materials of the invention are disclosed in copending application, Ser. No. 709,808 where a detailed description of their preparation may be found. Generally, the process for preparing the starting materials of the instant invention comprises reacting a 2-aminobenzenethiol of the Formula III:

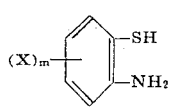

wherein X and m are as defined above with chloroacetic acid to form a compound having Formula IV:

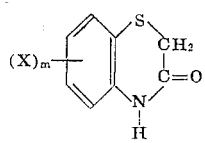

This lactam is then reacted with an aldehyde of the formula:

$$R^1\text{—CHO}$$

wherein $R^1$ is as defined above, in the presence of acetic anhydride and an organic amine, e.g., triethyl amine, tributyl amine, or in a solvent such as dimethylformamide with sodium methoxide, and so forth, to yield a compound having the Formula V:

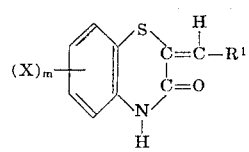

wherein $R^1$, X and m are as defined herein.

Although the above procedure may be utilized in the preparation of compounds related to the thia compounds, it is preferred to follow a different procedure in preparing the oxo containing and indolinone compounds of this invention. In such instances a nitro compound of Formula VI:

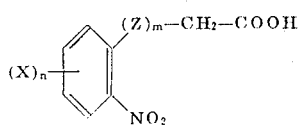

wherein X, Z, m and n are as defined herein and Z is oxo and is treated with a reducing agent, for example, hydrogen or sodium hydrosulfide to cyclize Compound VI and form Compound VII.

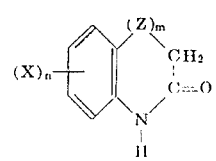

Compound VII is then reacted with an aldehyde (R'CHO) as set forth above for the preparation of Compound V to form a compound of Formula VIII:

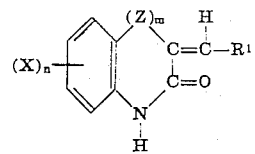

wherein X, Z, $R^1$, m and n are as defined herein. The above illustrates the procedure for preparing the starting materials of this invention.

The intermediates of Formulas V and VIII can then be worked up to the desired starting material by reacting it in an inert solvent, such as toluene, in the presence of an organic or inorganic base such as alkali metal amide, (e.g., sodamide), alkali metal hydride, alkoxide or hydroxide (e.g., sodium hydride, potassium butoxide, sodium methylate, powdered sodium hydroxide, and the like) with a basic halide of the Formula IX:

$$\text{Hal—A—NB} \qquad \text{IX}$$

wherein Hal is halogen, e.g., chloro or bromo and A and NB are as defined above, to yield the starting compounds of the instant invention having Formula II:

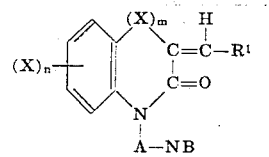

wherein R, $R^1$, X, Y, A, B, m, and n are as defined above.

In cases where X=OH, the latter group can be protected as the benzyl derivative and the latter group removed by catalytic debenzylation. Alternately, the hydroxy can be prepared by treating the corresponding methoxy compound with pyridine hydrochloride. In the case where $X=NH_2$, the latter is obtained by hydrogenation of the corresponding $NO_2$ compound, and where $NB=NH_2$ or a secondary amine, it is preferred to protect this group from reaction as the benzyl derivative and remove the protecting group as the last step of the procedure by known means, e.g., catalytic hydrogenation.

The compounds of Formula I wherein Y is sulfinyl may be obtained from the products wherein Y is thia, obtained as described above, by treating a solution of the acid solution salt dissolved in a solvent such as chloroform, acetic acid, water, and so forth, with one equivalent of an oxidizing agent such as hydrogen peroxide, potassium permanganate, m-chloroperbenzoic acid, perbenzoic acid, sodium periodate, and so forth.

Similarly, those products wherein Y is sulfonyl may be produced by reaction with two or more equivalents of the above-mentioned oxidizing agents.

Grignard reagents which may be utilized in the practice of this invention are phenylmagnesium bromide, (2, 3 or 4)-chlorophenylmagnesium bromide, (2, 3 or 4)methoxyphenyl-magnesium bromide, (2, 3 or 4)-ethylphenylmagnesium bromide, (2, 3 or 4)-trifluorophenylmagnesium bromide, (2, 3 or 4)-ethylthiophenylmagnesium bromide, (2, 3 or 4)-dimethylaminophenylmagnesium bromide, cyclopentylmagnesium chloride, cyclohexylmagnesium bromide, (2, 3 or 4)-fluorophenylmagnesium bromide, 3, 4 —difluorophenylmagnesium bromide, 2,4-dimethylphenylmagnesium bromide, 2,3-diethylphenylmagnesium bromide, and the like.

The following examples are illustrative of the invention, all temperatures are in degrees Centigrade:

EXAMPLE 1

4-(2-Dimethylaminoethyl)-2-(diphenylmethyl)-2H-1,4-benzothiazin-3(4H)-one, hydrochloride A solution of 9.0 g. of 2-benzylidene- 4-(21dimethyla4inoethyl)-2H-1,4-benzothiazin-3(4H)-one (m.p. 98°–100b$L$), in 50 ml. of tetrahydrofuran is stirred and treated with 15 ml. of 3N phenylmagnesium bromide in ether. The mixture is diluted with 500 ml. of anhydrous ether, refluxed for 1.5 hour, cooled and poured onto a solution of 5 g. of ammonium chloride in 50 ml. of ice-water. The organic phase is separated, dried, filtered and the solvent evaporated to give 13.4 g. of base. The salt is formed by dissolving the base in 70 ml. of ethanol, treating with one equivalent of alcoholic hydrogen chloride and the solution diluted to 700 ml. with ether to give 9.6 g. of product, m.p. 209°–22°. This material is digested in 50 ml. of hot acetonitrile and cooled to give 6.8 g. of nearly colorless solid, m.p. 228°–231°. After crystallization from 140 ml. of ethanol, the colorless solid weighs 6.5 g., m.p. 231°–233°.

EXAMPLE 2

4-(2-Diethylaminoethyl)-2-(diphenylmethyl)-2H-1,4-benzothiazin-3(4H)-one, hydrochloride Interaction of 7.4 g. of 2-benzylidene-4-(2-diethylaminoethyl)-2H-1,4-benzothiazin-3(4H)-one in 100 ml. of ether with 9 ml. of 3N phenylmagnesium bromide in ether according to the procedure of Example 1 gives 5.9 g. of base, m.p. 114°–116° (from acetonitrile). This material gives 6.2 g. of the hydrochloride salt, m.p. 226°–228°. After recrystallization from 80 ml. of ethanol, the colorless product weighs 5.5 g., m.p. 228°–230°.

EXAMPLE 3

4-[3-(4-Methyl-1-piperazinyl)propyl]-2-(diphenylmethyl)-2H-1,4-benzothiazin-3(4H)-one, hydrochloride, hydrate Interaction of 28.0 g. of 2-benzylidene-4-[3-(4-methyl-1-piperazinyl)propyl]-2H-1,4-benzothiazin-3(4H)-one in 100 ml. of tetrahydrofuran with 28 ml. of 3M phenylmagnesium bromide in ether according to the procedure of Example 1 gives 27 g. of base. The latter then yields 16.2 g. of the dihydrochloride salt, m.p. 238°–241° (dec). After crystallization from 200 ml. of ethanol, the product weighs 11.9 g., m.p. 240°–242° (dec).

EXAMPLE 4

1-(2-Dimethylaminoethyl)-3-(diphenylmethyl)-2-indolinone, hydrochloride

Treatment of a solution of 3-benzylidene-1-(2-dimethyl-aminoethyl)-2-indolinone in 200 ml. of tetrahydrofuran with 48 ml. of 3M phenyl magnesium bromide according to the procedure of Example 1 gives 41.1 g. of an oily base. The latter gives 28.8 g. of the hydrochloride, m.p. 233°–235°. After recrystallization from 900 ml. of ethanol, the pale yellow product weighs 22.9 g., m.p. 239°–241°.

EXAMPLE 5

4-(3-Dimethylaminopropyl)-2-(diphenylmethyl)-2H-1,4-benzothiazin-3(4H)-one, hydrochloride By substitution of an equivalent quantity of 2-benzylidene-4-(3-dimethylaminopropyl)-2H-1,4-benzothiazin-3(4H)-one for the 2-dimethylaminoethyl compound in Example 1, the product is obtained, m.p. 201°–203° (for isopropyl alcohol).

Example 6

2-(Diphenylmethyl)-4-(2-morpholinoethyl)-2H-1,4-benzoxazin-3-(4H)-one, hydrochloride Utilizing the procedure of Example 1 but substituting 2-benzylidene-4-(2-morpholinoethyl)-2H-1,4-benzoxazin-3-(4H)-one for the 2-benzylidene-4-(2-dimethylaminoethyl)-2H-1,4-benzothiazin-3(4H)-one, the product is obtained.

EXAMPLE 7

7-Chloro-2-[α-(4-chlorophenyl)-α-phenylmethyl]-4(3-piperidinopropyl)-2H-1,4-benzothiazin-3(4H)-one, hydrochloride Utilizing the procedure of Example 1 but substituting 2-benzylidene-7-chloro-4(3-piperidinopropyl)-2H-1,4-benzo-thiazin-3(4H)-one for the 2-benzylidene-4-(2-dimethylaminoethyl)-2H-1,4-benzothiazin-3(4H)-one and p-chlorophenylmagnesium bromide for the phenylmagnesium bromide, the product is obtained.

EXAMPLE 8

2-[α-Cyclohexyl-α-(4-dimethylaminophenyl)methyl]-4-[3-(N-methyl-N-ethylamino)propyl]-6-trifluoromethyl-2H-1,4-benzothiazin-3-(4H)-one, hydrochloride Utilizing the procedure of Example 1 but substituting 2-(4-dimethylaminobenzylidene)-4-[3-(N-methyl-N-ethyl)amino-propyl]6-trifluoromethyl-2H-1,4-benzothiazin-3(4H)-one for the 2-benzylidene-4-(2-dimethylaminoethyl)-2H-1,4-benzothiazin-3 (4H)-one and cyclohexylmagnesium boride for the phenyl-magnesium bromide, the product is obtained

EXAMPLE 9

4-[4-(N-Benzyl-N-methylamino)butyl]-2-[α-(2-furyl)-α-phenyl-methyl]-5-methoxy-2H-1,4-benzothiazin-3(4H)-one, hydrochloride Utilizing the procedure of Example 1 but substituting 4-[4-(N-benzyl-N-methylamino)butyl]-2-(α-furylidene)-5-methoxy-2H-1,4-benzothiazin-3(4H)-one for the 2-benzylidene-4-(2-dimethyl-aminoethyl)-2H-1,4-benzothiazin-3(4H)-one, the product is obtained.

EXAMPLE 10

7-Methyl-2-[α-phenyl-α-(2-pyridyl)methyl]-4-(2-pyrrolidinopropyl)-2H-1,4-benzothiazin-3(4H)-one, hydrochloride Utilizing the procedure of Example 1 but substituting 7-methyl-2-(C2-pyridylmethylene)-4-(2-pyrrolidinopropyl)-2H-1,4-benzothiazin-3(4H)-one for 2-benzylidene-4-(2-dimethylaminoethyl)-2H-1,4-benzothiazin-3(4H)-one, the product is obtained.

EXAMPLE 11

8-Bromo-4-[3-(3-ethylpiperidino)propyl]-2-[α-phenyl-α-(2-thienyl)methyl]-2H-1,4-benzothiazin-3(4H)-one, hydrochloride Utilizing the procedure of Example 1 but substituting 8-bromo-4-[3-(3-ethylipieridino)propyl]-2-thienylidene-2H-1,4-benzothiazin-3(4H)-one for 2-benzylidene-4-(2-dimethyl-aminoethyl)-2H-1,4-benzothiazin-3(4H)-one, the product is obtained.

EXAMPLE 12

6-Dimethylamino-4-[3-(N-hydroxyethyl-N-methyl)propyl]-2-[α-phenyl-α-(4-pyridyl)]-2H-1,4-benzothiazin-3(4H)-one, hydrochloride Utilizing the procedure of Example 1 but substituting 6-dimethylamino-4[3-(N-hydroxyethyl-N-methyl)propyl]-2-(4-pyridylmethylene)-2H-1,4-benzothiazin-3(4H)-one for 2-benzylidene-4-(2-dimethylaminoethyl)-2H-1,4-benzothiazin-3(4H)-one, the product is obtained.

EXAMPLE 13

2-(Diphenylmethyl)-4-[3-[4-(2-hydroxyethyl)piperazino]propyl]-6-nitro-2H-1,4-benzothiazin-3(4H)-one, hydrochloride Utilizing the procedure of Example 1 but substituting 2-benzylidene-4-[3-[4-(2-hydroxyethyl)piperazino]propyl]-6-nitro-2H-1,4-benzothiazine-3(4H)-one for 2-benzylidene-4-(2-dimethylaminoethyl)-2H-1,4-benzothiazin-3(4H)-one, the product is obtained.

EXAMPLE 14

4-(2-Dibenzylaminoethyl)-2-(diphenylmethyl)-2H-1,4-benzothiazin-3(4H)-one, hydrochloride Utilizing the procedure of Example 1 but substituting 2-benzylidene-4-(2-dibenzylaminoethyl)2H-1,4-benzothiazin-3(4H)-one for 2-benzylidene-4-(2-dimethylaminoethyl)-1,4-benzothiazin-3(4H)-one, product is obtained.

EXAMPLE 15

2-(α-(2-Methoxyphenyl)-α-phenylmethyl)-4-(2-thiamorpholino-ethyl-2H-1,4-benzoxazin-3(4H)-one, hydrochloride Utilizing the procedure of Example 1 but substituting 2-benzylidene-4-(2-thiamorpholinoethyl)-2H-1,4-benzoxazin-3 (4H)-one for 2-benzylidene-4-(2-dimethylaminoethyl)-2H-1,4-benzothiazin-3(4H)-one and 2-methoxyphenylmagnesium bromide for phenylmagnesium bromide, the product is obtained.

EXAMPLE 16

6-Benzyloxy-2[bis(4-chlorophenyl)methyl]-4-(2-dimethylaminoethyl)-2H-1,4-benzothiazin-3 (4H)-one, hydrochloride Utilizing the procedure of Example 1 but substituting 6-benzyloxy-2-(4-chlorobenzylidene)-4-(dimethylaminoethyl)-2H-1,4-benzothiazin-3 (4H)-one for 2-benzylidene-4-(2-dimethylaminoethyl)-2H-1,4-benzothiazin-3 (4H)-one and 4-chlorophenylmagnesium bromide for phenylmagnesium bromide, the product is obtained.

Example 17

1-(2-Dimethylaminoethyl)-3[α-phenyl-α-(3pyridyl)methyleg-2-indolinone, hydrochloride Utilizing the procedure of Example 1 but substituting 3-(3-pyridylmethylene)-1-(2-dimethylaminoethyl)-2-indolinone for 2-benzylidene-4-(2-dimethylaminoethyl)-2H-1,4-benzothiazin-3(4H)-one, the product is obtained.

EXAMPLE 18

4-(2-Dimethylaminoethyl)-2-(diphenylmethyl)-2H-1,4-benzothiazin-3(4H)-one-1-oxide, hydrochloride A solution of material from Example 1 in chloroform is treated with one equivalent of m-chloroperbenzoic acid at room temperature. After 2 hours, the solution is concentrated to give the product.

EXAMPLE 19

4-(2-Dimethylaminoethyl)-2-(diphenylmethyl)-2H-1,4-benzothiazin-3(4H)-one-1,1-dioxide, hydrochloride A solution of material from Example 1 in chloroform is treated with two equivalents of m-chloroperbenzoic acid and the solution is refluxed for one hour. The solvent is removed under reduced pressure to give the product.

EXAMPLE 20

2-[α-(2-Furyl)-α-phenylmethyl]-4-(4-methylaminobutyl)-5-methoxy-2H-1,4-benzothiazin-3(4H)-one, hydrochloride A solution of material from Example 9 in ethanol is treated with 5 percent palladium-carbon catalyst and hydrogenated under three atmospheres of pressure. After one equivalent of hydrogen is consumed, the pressure is released, the catalyst filtered and the filtrate concentrated under reduced pressure to give the product.

EXAMPLE 21

4-(2-Aminoethyl)-2-(diphenylmethyl)-2H-1,4-benzothiazin-3 (4H)-one, hydrochloride A solution of material from Example 14 in ethanol is reduced in the manner described in Example 20. After two equivalents of hydrogen is consumed, the product is obtained.

EXAMPLE 22

2-[Bis(4-chlorophenyl(methyl]-4-(2-dimethylaminoethyl)-6-hydroxy-2H-1,4-benzothiazin-3-(4H)-one, hydrochloride By treatment of the material from Example 16 with hydrogen in the same manner as described in Example 20, the product is obtained.

EXAMPLE 23

6-Amino-2-(diphenylmethyl)-4-[3-[4-(2-hydroxyethyl)piperazino]-propyl]-2H-1,4-benzothiazin-3-(4H)-one, hydrochloride A mixture of the material from Example 13, ethanol and palladium-carbon catalyst is hydrogenated under three atmospheres of pressure. After three equivalents of hydrogen is consumed, the pressure is released, the catalyst is filtered and the filtrate concentrated under reduced pressure to give the product.

EXAMPLE 24

4-(2-Dimethylaminoethyl)-2-[α-(2-naphthyl)-α-phenylmethyl]-2H-1,4-benzothiazin-3(4H)-one, hydrochloride Utilizing the procedure of Example 1 but substituting 4-(2-dimethylaminoethyl)-2-(2-naphthylidene)-2H-1,4-benzothiazin-3 (4H)-one for 2-benzylidene-4-(2-dimethylaminoethyl)-2H-1,4-benzothiazin-3 (4H)-one, the product is obtained.

EXAMPLE 25

4-(2-Dimethylaminoethyl)-2-(diphenylmethyl)-2H-1,4-benzothiazin-3 (4H)-one, maleate The free base of Example 1 is dissolved in acetonitrile and treated with a solution of an equivalent amount of maleic acid in acetonitrile. This solution is diluted with ether to give the product.

EXAMPLE 26

4-(2-Dimethylaminoethyl)-2-(diphenylmethyl)-2H-1,4-benzothiazin-3 (4H)-one, methobromide The free base of Example 1 is dissolved in acetonitrile and treated with five equivalents of methyl bromide. After standing at room temperature for 24 hours, the solvent and the excess methyl bromide is removed to give the product.

EXAMPLE 27

4-(2-Dimethylaminoethyl)-2-[α-(3-methoxyphenyl)-α-(4-nitro-phenyl)methyl]-2H-1,4-benzothiazin-3(4-H)-one, hydrochloride Utilizing the procedure of Example 1 but substituting 4-(2-dimethylaminoethyl)-2-(4-nitrobenzylidene)-2H-1,4-benzothiazin-3(4H)-one for 2-benzylidene-4-(2-dimethylmaino-ethyl)-2H-1,4-benzothiazin-3 (4H)-one and 3-methoxyphenyl-magnesium bromide for phenylmagnesium bromide, the product is obtained.

EXAMPLE 28

4-(2-Dimethylmainoethyl)-2-[α-(3-hydroxyphenyl)-α-(4-nitrophenyl)methyl]-2H-1,4-benzothiazin-3(4H)-one, hydrochloride A mixture of the material from Example 27 and pyridine hydrochloride is heated at 100° for one hour to give the product.

What is claimed is:

1. A compound selected from the group consisting of the formula:

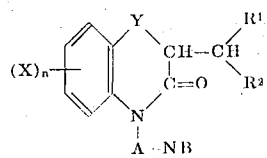

wherein Y is sulfur and sulfoxide; X is hydrogen, halogen, trifluoromethyl, loweralkoxy, loweralkylthio, amino, diloweralkylamino, hydroxy or nitro; $R^1$ is X-substitutedphenyl, thienyl, furyl, pyridyl or naphtyl; $R^2$ is X-substitutedphenyl, thienyl, furyl, pyridyl, naphthyl or cycloalkyl having up to six carbon atoms; and $n$ is 1 to 4; A is lower alkylene and NB is amino, (lower alkyl) amino, diloweralkylamino, (hydroxy lower alkyl) amino, (hydroxy lower alkyl) (lower alkyl)- amino, phenyl(lower alkyl) amino; N-phenyl lower alkyl-(lower alkyl)amino; and saturated 5- to 7-membered monocyclic heterocyclic radicals of less than twelve carbon atoms selected from the group consisting of piperidino; (lower alkyl)piperidino;di (lower alkyl) piperidino (lower alkoxy)piperidino; homopiperidino; 2,3- or 4-piperidyl; 2,3- or 4-(N-lower alkylpiperidyl); pyrrolidino; (lower alkyl)pyrrolidino; di (lower alkyl)pyrrolidino; (lower alkoxy)pyrrolidino; 2- or 3-pyrrolidyl; 2- or 3-(N-lower alkyl pyrrolidye); morpholino; (lower alkyl)morpholino; di(lower alkyl)morpholino; (lower alkoxy)morpholino; thiamorpholino; (lower alkyl)thiamorpholino; di(lower alkyl)-thiamorpholino; (lower alkoxy)thiamorpholino; piperazino; 4-X-substituted piperazino; piperazino; (lower alkyl)piperazino; di(lower alkyl)piperazino; (lower alkoxy)piperazino; homopiperazino; and 4-X-substituted homopiperazino and pharmaceutically acceptable salts thereof.

2. A compound selected from the group consisting of the formula:

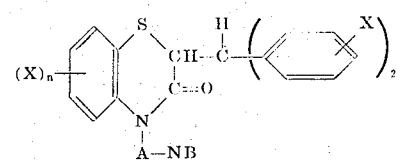

wherein X, A, NB and n are as defined in claim 1 and pharmaceutically acceptable acid-addition salts thereof.

3. A compound in accordance with claim 1 having the name 4-(2-dimethylaminoethyl)-2-(diphenylmethyl)-2H-1,4-benzothiazin-3(4H)-one, hydrochloride.

4. A compound in accordance with claim 1 having the name 4-(2-diethylaminoethyl)-2-(diphenylmethyl)-2H-1,4-benzothiazin-3(4H)-one, hydrochloride.

5. A compound in accordance with claim 1 having the name 4-[3-(4-methyl-1-piperazinyl)propyl]-2-(diphenylmethyl)-2H-1,4-benzothiazin-3(4H)-one, hydrochloride, hydrate.

6. A compound in accordance with claim 1 having the name 4-(3-dimethylaminopropyl)-2-(diphenylmethyl)-2H-1,4-benzothiazin-3(4H)-one, hydrochloride.

7. A compound in accordance with claim 1 having the name 4-[4-(N-benzyl-N-methylamino)butyl]-2-[α-(2-furyl)-α-phenylmethyl]-5-methoxy-2H-1,4-benzothiazin-3 (4H)-one, hydrochloride.

* * * * *